Dec. 8, 1959 W. F. GUNKEL 2,916,048
MAGNETICALLY ACTUATED VALVE
Filed Jan. 25, 1957

WILLIAM F. GUNKEL
INVENTOR

BY Killman and Kerst
ATTORNEYS

United States Patent Office 2,916,048
Patented Dec. 8, 1959

2,916,048

MAGNETICALLY ACTUATED VALVE

William F. Gunkel, Baltimore, Md., assignor to Bendix Aviation Corporation, Towson, Md., a corporation of Delaware Application January 25, 1957, Serial No. 636,300

5 Claims. (Cl. 137—544)

This invention relates to valves and more particularly to a valve construction capable of rapid opening and closing and of passing an amount of fluid which is an accurate function of the duration of the open time of the valve.

Valves of this type are employed in fuel injection systems for internal combustion engines in which the fuel is maintained under constant pressure. In such systems a magnetically actuated valve is supplied for each cylinder and the valves are sequentially opened in synchronism with the rotation of the engine, the fuel demands being controlled by varying the duration of the open time of each valve.

In such usage it is essential that the valve open and close quickly, that fuel flow begins as soon as possible after the valve is open, and that the flow within the valve be free of turbulence. A turbulent flow does not provide an amount of fuel which varies accurately with the duration of valve open time.

It is an object of the present invention to provide a valve construction in which turbulence in the flow of fluid through the valve is greatly reduced over that occurring in previously known valves.

It is a further object of the invention to provide a valve construction in which the time required for fluid flow to start at the opening of the valve is considerably decreased.

These and other objects and advantages of the invention are realized in a valve construction in which the movable portion of the valve is carried by a piston which is solenoid actuated. This portion seats on a cylindrical seat carried by a tube which protrudes into a conically walled inlet chamber, and forms with the walls of the inlet chamber and said tube an annular inlet passage the cross-sectional area of which decreases progressively and smoothly as the seat is approached. The entrance to the inlet chamber is by way of a flow-smoothing filter of porous material and the walls of the tube are splined to further smooth the flow. A feedback tube extends from the end of the said valve carrying piston remote from the inlet back to the fluid inlet, and operates to feed a pressure impulse to the inlet coincident with the movement of the piston in opening the valve.

Figure 1:
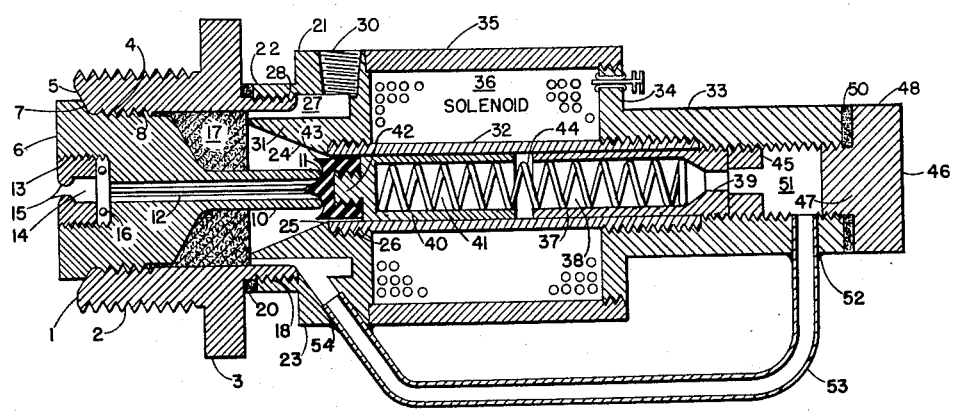
Fig. 1 is an elevational view in cross-section of a solenoid operated valve embodying the invention.

Referring now more particularly to the drawings, there is shown in Fig. 1 an annular member 1 forming the base of the valve which will, for purposes of description, be referred to as its lower end. The major portion of its exterior surface is cylindrical and provided with threads, as at 2, by means of which the valve is mounted in an opening formed in an engine block. The upper portion 3 of the member may have its exterior surface formed in the shape of a polygon which may be engaged by a wrench. The lower portion of the inner surface of the member 1 is threaded, as at 4, and the base of the threaded portion connects with the base of the member by means of a cone shaped shoulder 5.

Figure 3:
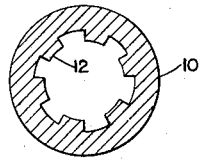

Received within the base of the member 1 is a cylindrical member 6 having a flared bottom portion connected to its lower side wall by means of a conical shoulder 7 mating with the shoulder 5 of the member 1. The lower portion of the member 6 above the shoulder 7 is threaded, as at 8, and is of a size to screw snugly into the portion 4 of the member 1. The upper portion of the member 6 converges to a central cylindrical tube 10 terminating at its upper end in a rounded lip 11 which serves as the valve seat. The interior of the tube 10 is provided with splines 12 which are more clearly shown in Fig. 3. The purpose of these splines is to smooth the flow of fluid as it leaves the valve. Inserted in the bottom end of the member 6 and coaxial therewith is a cylindrical element 13 having a central bore 14 which is a continuation of a bore of the tube 10. The lower end of this bore is constricted by lips 15 to form an orifice which shapes the fluid into a spray and meters it as it leaves the valve. The element 13 is screwed into the member 6 against a packing ring 16 which prevents fluid leakage.

The annular space surrounding the lower portion of the tube 10 is filled with a filter 17 of porous material which may, for example, be metal wool, for the purpose of smoothing the flow of fluid therethrough.

The member 1 continues beyond the portion 3 in a cylinder 18 of reduced diameter. Mounted on the portion 18 against packing material 20 is a fitting 21. This fitting is of a cylindrical exterior shape having a reduced portion 22 received about the portion 18 of member 1 and a portion 23 of larger diameter.

A central bore extends through the fitting, the lower portion having conical side walls as indicated at 24 which converge and terminate in a shoulder 25 which communicates with a larger threaded bore 26 extending through the remainder of the fitting. Surrounding the central bore and coaxial therewith is an annular bore 27 which extends into the fitting from its lower end. The lower portion of the exterior side wall of this bore is threaded as at 28 for attachment to the cylinder 18 of the member 1. A pipe threaded bore 30 communicates from the exterior of the fitting to the upper end of the bore 27. This is the inlet opening of the valve into which a fuel carrying tube is normally secured. The portion of the fitting between the bore 27 and the conical wall 24 forms an annular skirt 31, the lower end of which is in contact with the porous material 17.

Threaded into the bore 26 is a tube 32 which is made of non-magnetic material, such, for example as stainless steel, on the other end of which is threadedly received a tubular member 33 having on its lower end an outwardly directed flange 34. Threadedly received around the outer lateral surface of this flange is one end of a cylinder 35, the other end of which is received into a shouldered portion of the fitting 21. The tube 32, the flange 34, the cylinder 35, and the fitting 21 form a chamber enclosing a solenoid winding 36.

Snugly received within the upper end of the tube 32 is a tube 37 having a central bore 38, the upper end of which is constricted as at 39. The upper end of the tube 37 is threadedly received by the member 33. Also slidably received in the lower end of the tube 32 is a member 40 having a central bore 41 of the same size as the bore 38. The lower end of the member 40 is closed and carries a threaded extension 42 upon which is threadedly secured a mounted nylon valve element 43.

Received within the bores 38 and 41 is a spiral spring 44 which presses against the closed end of member 40 and the restricted end 39 of the member 37 and thus holds the valve element 43 in contact with the end 11 of the member 6.

Threadedly received within the member 33 is an annular nut 45 which is positioned in contact with the end of tubular member 37 to lock it in place. The upper end of the tube 33 is closed by a plug 46 having a lower portion 47 threadedly received within the member 33 and an upper portion 48 of enlarged diameter, the lateral surface of which may be formed into a hexagonal shape to receive a wrench. A packing washer 50 is positioned between the member 33 and the portion 48 of the plug. A chamber 51 is formed between the lower end of the plug and the upper end of the nut 45 and in the side wall of the member 33 is formed a bore 52 receiving in a fluid-tight manner an end of a tube 53. The other end of this tube is received in a fluid-tight manner in a bore 54 formed in the fitting 21 and communicating with the bore 27. Sweat soldering may be used in joining the ends of tube 53 to the bores 52 and 54.

The members 21 and 33, the cylinder 35 and the tubes 37 and 40 should all be made of some magnetically soft material, such, for example, as silicon iron.

Figure 2:
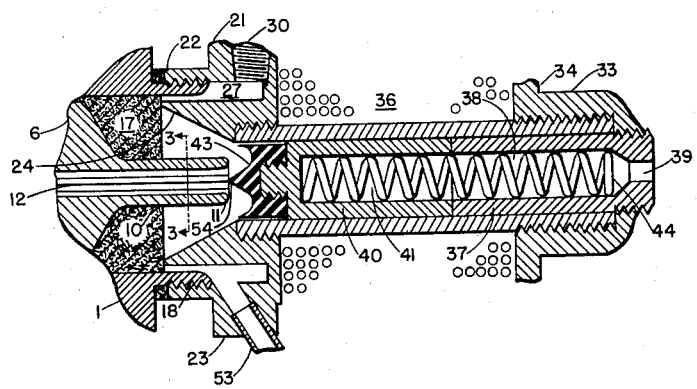
Fig. 2 is a cross-sectional view of a fragment of the valve of Fig. 1 showing the valve in its open position, and, Fig. 3 is a cross-sectional view of the valve seat carrying tube of the valve of Fig. 2, taken along the line 3—3.

Fig. 1 shows the valve in its unoperated or closed position which exists as long as the solenoid 36 is not energized. Upon energization of the solenoid 36 the member 40 is moved quickly to the right, as shown, until it comes in contact with the lower end of the member 37 as shown in Fig. 2. This raises the valve element 43 from contact with the upper end 11 of the tube 10, leaving an annular opening between the member 43 and the end 11. As will be seen in Fig. 2, the lower end of the valve element 43 is formed with a conical tip 54, the skirts of which are of an arcuate configuration such that, when the valve is in its open position, the conical surface of the element 43 forms a smooth continuation of the conical wall 24. With the valve in its open position, as shown in Fig. 2, the space between the tube 10 and the wall formed of the conical portion 24 and the arcuate portion 43 forms an annular chamber having its major cross-sectional area at the upper surface of the porous material 17 and this cross-sectional area progressively and smoothly decreases in size in an upward direction, reaching its smallest size at the tip of the conical surface 54 of the element 43.

Fluid flow is thus from the inlet 30 through the annular chamber 27, then through the porous material 17 and the annular chamber surrounding the tube 10, and from there into the splined interior 12 of the tube 10 and out through the orifice 14. Any turbulence in the flow is greatly reduced by the passage of the fluid through the porous material 17 and the smoothly decreasing cross-sectional area of the chamber surrounding the tube 10 prevents the setting up of turbulence in the fluid after it leaves the material 17. The splines within the tube 10 remove any remaining turbulence.

The tube 53 operates to communicate a pressure impulse from the bore 38 of the member 37 to the fluid in the chamber 27 as the piston-like member 40 is moved quickly to the right, upon the energization of solenoid 36. This pressure impulse, acting on the fluid in chamber 27 coincident with the opening of the valve, has the effect of overcoming the inertia of the fluid and accelerating its initial flow upon the opening of the valve.

What is claimed is:

1. In a valve, means forming a cylindrical outlet passage, said means comprising a tube having an end constituting a valve seat, an element movable in two opposite directions parallel to the axis of said tube between limiting positions, in one of which a portion of an end face of said element is in contact with said seat, closing said valve, and in the other of which said portion of said end face of said element is removed from said seat, and means forming an annular inlet passage surrounding said tube, a mass of porous material completely filling said inlet passage over a part of its length spaced from said seat, the walls of said inlet passage converging from said filled part to said end face of said element when said element is in said other position, said end face of said element being so shaped as to form an arcuate continuation of said walls converging toward said seat with its center having the minimum spacing therefrom, whereby the cross-sectional area of said inlet passage progressively and continuously decreases in size from said portion to said seat.

2. In a valve, means forming a cylindrical outlet passage, said means comprising a tube having an end constituting a valve seat, an element movable in two opposite directions parallel to the axis of said tube between limiting positions, in one of which a portion of an end face of said element is in contact with said seat, closing said valve, and in the other of which said portion of said end face of said element is removed from said seat, means forming an annular inlet passage surrounding said tube, a mass of porous material completely filling said inlet passage over a part of its length spaced from said seat, the walls of said inlet passage converging toward said tube and the portion of said end face of said element converging toward said seat from the periphery to the center thereof, whereby merging with said walls and the cross-sectional area of said inlet passage progressively decreases in size from said part to said seat when said element is in said other position, and means actuated by the movement of said element to said other position to apply a pressure impulse to fluid contained in said passage.

3. In a valve, means forming a cylindrical outlet passage, said means comprising a tube having an end constituting a valve seat, a piston movable in two opposite directions between limiting positions, said movement being parallel to the axis of said tube, a portion of an end face of said piston in one of said limiting positions being in contact with said valve seat, closing said valve, and in the other of said limiting positions being spaced from said seat, a fluid tight cylinder surrounding said piston, means forming an annular inlet passage surrounding said tube, a mass of porous material completely filling said inlet passage over a part of its length spaced from said seat, the walls of said inlet passage converging toward said tube and the said end face of said piston merging with said walls and converging toward said seat from the periphery to the center thereof, whereby the cross-sectional area of said inlet passage progressively decreases in size from said part to said seat when said piston is in said other position, and means forming a passage between the remaining end of said piston and a point in said inlet passage on the opposite side of said part from said seat, whereby movement of said piston to said other of said limiting positions applies a pressure impule to fluid in said inlet passage.

4. In a valve, means forming a cylindrical outlet passage, said means comprising a tube having an end constituting a valve seat, a piston movable in two opposite directions between limiting positions, said movement being parallel to the axis of said tube, a portion of an end face of said piston in one of said limiting positions being in contact with said valve seat, closing said valve, and in the other of said limiting positions being spaced from said seat, a fluid tight cylinder surrounding said piston, a solenoid winding surrounding said cylinder, whereby energization of said solenoid winding moves said piston to said other of said limiting positions, spring means urging said piston to said one of said limiting positions, means forming an annular inlet passage surrounding said tube, a mass of porous material completely filling said inlet passage over a part of its length spaced from said seat, the walls of said inlet passage converging toward said tube and the said end face of said piston merging with said walls and converging toward said seat from the periphery to the center thereof, whereby the cross-sectional area of said inlet passage progressively decreases in size from said part to said seat when said piston is in said other position, and means forming a passage between the remaining end of said piston and a point in said inlet passage on the opposite side of said part from said seat, whereby movement of said piston to said other of said limiting positions applies a pressure impulse to fluid in said inlet passage.

5. In a valve, means forming a cylindrical outlet passage, said means comprising a tube having an end constituting a valve seat, an element having a conical central portion merging into a smoothly curved divergent base portion and movable in two opposite directions parallel to the axis of said tube between limiting positions, in one of which said conical portion of said element is positioned with the axis of said conical portion aligned within said tube and in contact with said seat closing said valve, and in the other of which said conical portion of said element is removed from said seat, and means forming an annular inlet passage surrounding said tube, a mass of porous material completely filling said inlet passage over a portion of its length spaced from said seat, the walls of said inlet passage converging from said portion to said base portion of said element when said element is in said other position, said element being shaped to form an arcuate continuation of said walls curving back to merge smoothly with said conical portion whereby the cross-sectional area of said inlet passage progressively and continuously decreases in size from said portion to said seat.

References Cited in the file of this patent

UNITED STATES PATENTS

| | | |
|---|---|---|
| 1,274,924 | Michaels | Aug. 6, 1918 |
| 1,730,408 | Collins | Oct. 8, 1929 |
| 2,108,979 | Wile | Feb. 22, 1938 |
| 2,299,707 | Svirsky | Oct. 20, 1942 |
| 2,430,152 | Wiley | Nov. 4, 1947 |

FOREIGN PATENTS

| | | |
|---|---|---|
| 498,563 | France | Oct. 22, 1919 |